United States Patent
Kobayashi et al.

(10) Patent No.: US 7,646,687 B2
(45) Date of Patent: Jan. 12, 2010

(54) METHOD FOR DETERMINING RECORDING LASER POWER FOR SUPER-RESOLUTION OPTICAL RECORDING MEDIUM AND APPARATUS FOR RECORDING INFORMATION ON SUPER-RESOLUTION OPTICAL RECORDING MEDIUM

(75) Inventors: Tatsuhiro Kobayashi, Tokyo (JP);
Takashi Kikukawa, Tokyo (JP);
Narutoshi Fukuzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 501 days.

(21) Appl. No.: 11/783,218

(22) Filed: Apr. 6, 2007

(65) Prior Publication Data

US 2007/0247990 A1 Oct. 25, 2007

(30) Foreign Application Priority Data

Apr. 21, 2006 (JP) ................ 2006-117622

(51) Int. Cl.
*G11B 7/125* (2006.01)
(52) U.S. Cl. ................................. 369/47.53
(58) Field of Classification Search .......... None
See application file for complete search history.

(56) References Cited

U.S. PATENT DOCUMENTS 5,706,259 A * 1/1998 Fukamachi et al. ...... 369/13.06
6,246,661 B1 * 6/2001 Toda et al. ............... 369/116
7,218,587 B2 * 5/2007 Tseng et al. ............. 369/47.53
2002/0036962 A1 * 3/2002 Masaki et al. ........... 369/47.53
2005/0083803 A1 * 4/2005 Kimura ................... 369/47.5

FOREIGN PATENT DOCUMENTS

JP      A 3-91124    4/1991
JP      A 2003-6872  1/2003

* cited by examiner

*Primary Examiner*—Peter Vincent Agustin
*Assistant Examiner*—Jesse Hauck
(74) *Attorney, Agent, or Firm*—Oliff & Berridge, PLC

(57) ABSTRACT

A method for determining recording laser power on a super-resolution optical recording medium, on which information is recorded on a super-resolution optical recording medium by irradiating a laser beam modulated into a recording pulse train according to recording data to thereby form a recording mark train including recording marks and spaces smaller than the resolution limit of a reproduction optical system and recording marks and spaces equal to or larger than the resolution limit, is provided. At the time of recording, the method determines a minimum value and a maximum value of recordable laser powers determined by test-writing before recording, and determines a maximum value of a recordable range of laser power by adding to the minimum value one-third of a difference between the maximum value of the recordable laser powers and the minimum value. The method determines an optimal range of recording laser power from the minimum value of recordable laser powers to the maximum value of the recordable range.

2 Claims, 3 Drawing Sheets

US 7,646,687 B2

METHOD FOR DETERMINING RECORDING LASER POWER FOR SUPER-RESOLUTION OPTICAL RECORDING MEDIUM AND APPARATUS FOR RECORDING INFORMATION ON SUPER-RESOLUTION OPTICAL RECORDING MEDIUM

BACKGROUND OF THE INVENTION

1. Field of the Invention

The present invention relates to a method for determining recording laser power for a super-resolution optical recording medium from which recording marks can be reproduced that are smaller than the resolution limit of a reproduction optical system. The invention also relates to an apparatus for recording information on such a super-resolution optical recording medium.

2. Description of the Related Art

Recently, as described in, for example, Japanese Patent Laid-Open Publication No. 2003-6872, a super-resolution optical recording medium has been suggested which enables the reproduction of a recording mark train that is smaller than the diffraction limit of a reproduction optical system.

This super-resolution optical recording medium enables the reproduction of a minute recording mark (also known as a super-resolution recording mark) that is smaller than the resolution limit of a reproduction optical system, however, the principle of how this is enabled has not yet been made known.

Generally, in a reproduction system employing an optical system with a reproduction wavelength of λ and an objective lens numerical aperture of NA, a cut-off frequency is defined as $f_c = 2\,NA/\lambda$, and a period corresponding to a frequency higher than that cut-off frequency cannot be read. In terms of length, in a reproduction system employing an optical system with a reproduction wavelength of λ and an objective lens numerical aperture of NA, a periodic structure having a period less than $D_c = 1/f_c = \lambda/NA/2$ cannot be recognized as a period. The value $D_c$ is referred to as the diffraction limit. The period in optical recording is defined by a paired mark (or pit) and space. Super-resolution reproduction is a reproduction technique capable of separating a paired mark and space in a periodic structure having a period shorter than $D_c$. When the length of a mark is equal to the length of a space, the diffraction limit corresponding to the above period can be conveniently represented by the length of the mark (or the space), $L_c = D_c/2 = \lambda/NA/4$. The length $L_c$ is referred to as the resolution limit.

A general method for determining recording laser power, when data is recorded on an optical recording medium, is described in, for example, Japanese Patent Laid-Open Publication No. Hei 3-91124. In this case, a plurality of data sets is test-written at different laser powers. The written data sets are reproduced, and error characteristics are measured to determine a recordable range. Then, the central value of the recordable range is used as the recording laser power.

In Japanese Patent Laid-Open Publication No. Hei 3-91124, the recordable range is a range in which errors in reproduction data can be corrected when a laser power within that range is used for recording.

SUMMARY OF THE INVENTION

In view of the foregoing problems, various exemplary embodiments of this invention optimize a method for determining, when data is recorded on a super-resolution optical recording medium, recording laser power during irradiation of a laser beam modulated into a recording pulse train according to the recording data.

Various exemplary embodiments of this invention provide an apparatus for recording information on a super-resolution optical recording medium by means of the method for determining recording laser power.

The present inventor has made intensive studies of recording laser power during recording on a super-resolution optical recording medium. Consequently, the inventors have found that, when the recording laser power is determined by a method similar to that used for a conventional optical recording medium, the separability of the waveform of a reproduction signal is poor when marks smaller than a resolution limit are reproduced. This is because uniformity in the levels of the reproduction signal cannot be maintained due to intersymbol interference during recording. However, the inventor has found that the waveform of a reproduction signal during reproduction is improved by setting the lower recording laser power.

In summary, the above-described objectives are achieved by the following embodiments of the present invention.

(1) A method for determining a laser power when information is recorded on a super-resolution optical recording medium by irradiating a laser beam modulated into a recording pulse train according to recording data to thereby form a recording mark train including recording marks and spaces smaller than a resolution limit of a reproduction optical system and recording marks and spaces equal to or larger than the resolution limit, the method comprising the steps of: determining a maximum value and a minimum value of recordable laser powers determined by test-writing before recording; determining a maximum value of a recordable range of recording laser power by adding to the minimum value one-third of a difference between the maximum value of the recordable laser powers and the minimum value; and setting an optimal range of the recording laser power from the minimum value of the recordable laser powers to the maximum value of the recordable range.

(2) An apparatus for recording information on a super-resolution optical recording medium by irradiating a laser beam modulated into a recording pulse train according to recording data to thereby form a recording mark train including recording marks and spaces smaller than a resolution limit of a reproduction optical system and recording marks and spaces equal to or larger than the resolution limit, the apparatus comprising: a head for irradiating the laser beam onto the super-resolution optical recording medium; a laser drive circuit for supplying the head with a laser drive signal for modulating the laser beam into the recording pulse train; a laser control circuit for generating the laser drive signal; and a recording laser power determination circuit which determines a minimum value and a maximum value of recordable laser powers determined by test-writing before recording, determines a maximum value of a recordable range of laser power by adding to the minimum value one-third of a difference between the maximum value of the recordable laser powers and the minimum value, sets an optimal range of the recording laser power from the minimum value of the recordable laser powers to the maximum value of the recordable range, and outputs the optimal range to the laser drive circuit.

The present invention provides a method for determining optimum laser power when recording marks are formed on a super-resolution optical recording medium, and an information recording apparatus using the method.

DETAILED DESCRIPTION OF THE PREFERRED EMBODIMENTS

The foregoing objects are achieved by a recording laser power determination method in accordance with the best mode. In the best mode, when information is recorded on a super-resolution optical recording medium, an optimum range for recording laser power is set as being from the lower limit of a recordable range determined by test-writing before the recording up to a value obtained by adding one-third of the width of the recordable range to that lower limit. In this case, the information is recorded by irradiating a laser beam, modulated into a recording pulse train according to recording data, to thereby form a recording mark train that includes recording marks and spaces smaller than the resolution limit of a reproduction optical system and recording marks and spaces equal to or larger than that resolution limit.

Hereinafter, an exemplary embodiment of the present invention will be described in detail with reference to FIGS. 1 to 3.

Figure 2:
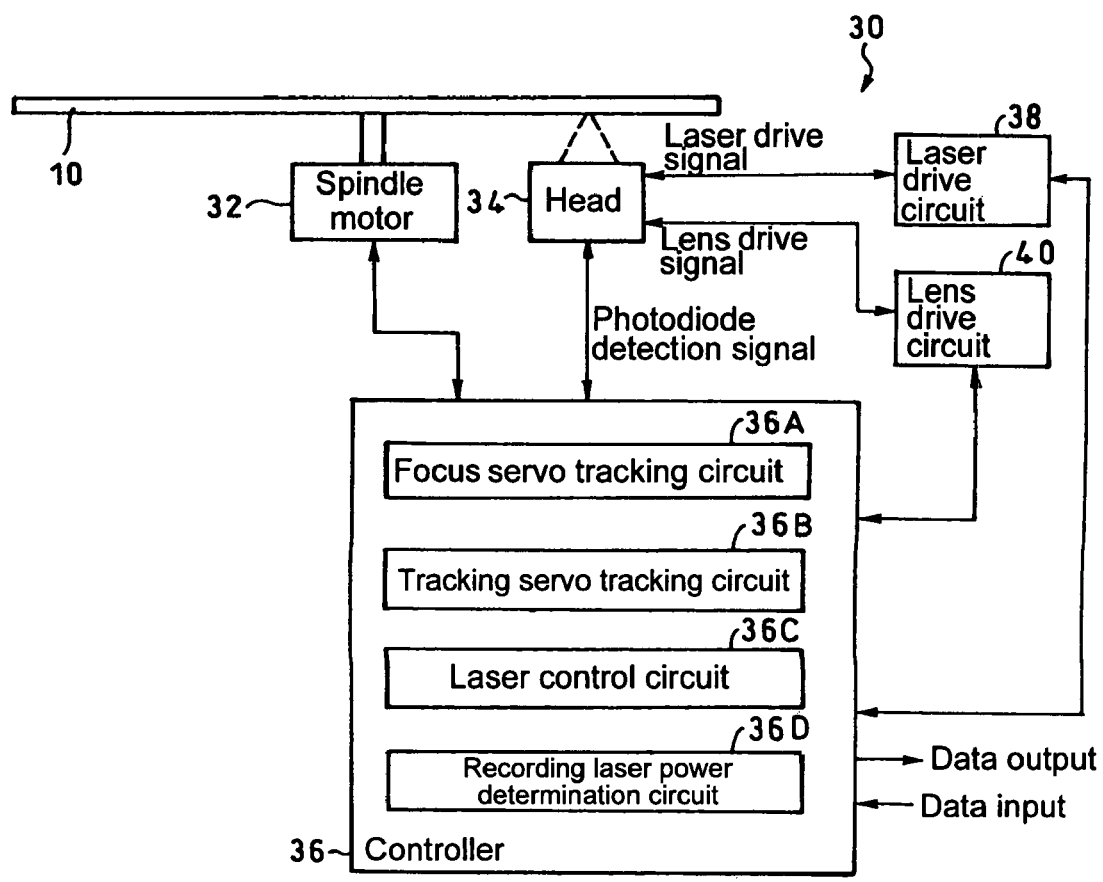
FIG. 2 is a block diagram schematically illustrating an information recording and reproducing apparatus in accordance with the exemplary embodiment of the present invention.

In this exemplary embodiment, information is recorded on and reproduced from a super-resolution optical recording medium 10 by means of an information recording and reproducing apparatus 30 shown in FIG. 2.

Figure 1:
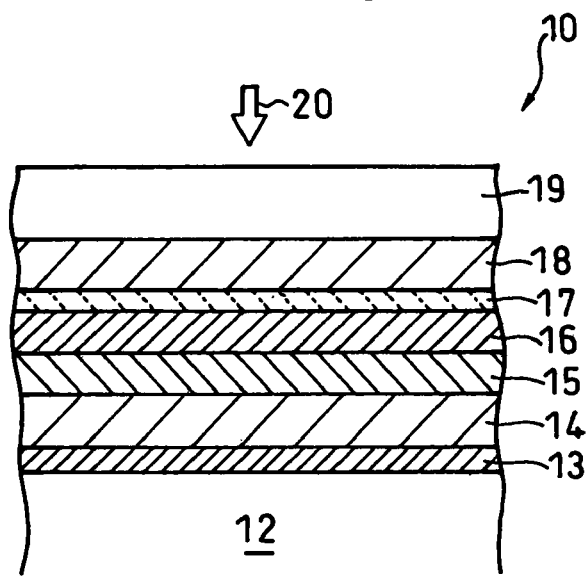
FIG. 1 is an enlarged schematic cross sectional view showing a main portion of a super-resolution optical recording medium of an exemplary embodiment of the present invention.

As shown in FIG. 1, the super-resolution optical recording medium 10 is formed by stacking a reflection layer 13, a third dielectric layer 14, a light absorbing layer 15, a second dielectric layer 16, a decomposition reaction layer 17 containing platinum oxide as a main component, a first dielectric layer 18, and a light transmission layer 19 in this order on a substrate 12. When a laser beam 20 is irradiated onto the decomposition reaction layer 17 through the light transmission layer 19, the platinum oxide contained as the main component in the decomposition reaction layer 17 is decomposed into platinum and oxygen. The generated oxygen gas forms a void, and fine particles of platinum are precipitated in the void, whereby a recording mark is formed in the decomposition reaction layer 17.

The information recording and reproducing apparatus 30 is configured to include: a spindle motor 32 for rotating the super-resolution optical recording medium 10; a head 34 for irradiating the laser beam onto the super-resolution optical recording medium 10; a controller 36 for controlling the head 34 and the spindle motor 32; a laser drive circuit 38 for supplying a laser drive signal for modulating the laser beam from the head 34 into a pulse train; and a lens drive circuit 40 for supplying a lens drive signal to the head 34.

The controller 36 includes a focus servo tracking circuit 36A, a tracking servo tracking circuit 36B, a laser control circuit 36C, and a recording laser power determination circuit 36D.

The laser control circuit 36C is a circuit for generating the laser drive signal to be supplied from the laser drive circuit 38. When data is recorded, the laser control circuit 36C generates an appropriate laser drive signal based on recording condition setting information recorded on a target super-resolution optical recording medium.

The recording condition setting information is information used for determining various conditions required for recording data on the super-resolution optical recording medium. In this exemplary embodiment, the recording condition setting information includes at least the information required for determining a recording strategy to be described later.

Examples of the recording condition setting information include not only information specifically indicating various conditions required for recording data but also information for determining recording conditions by specifying any of various conditions pre-stored in the information recording and reproducing apparatus.

When data is recorded, a laser beam is pulse-modulated and is irradiated onto a recording layer. Settings such as the number of pulses, the pulse width, the pulse interval, and the power at the time of modulation constitute the recording strategy.

The data to be recorded is converted so as to correspond to recording mark lengths along a track of the recording layer and is recorded such that the length of recording marks and spaces corresponds to an integer multiple of one clock cycle T, i.e., nT.

The recording laser power determination circuit 36D is a circuit for determining the recording laser power. When data is recorded, this circuit 36D determines the level of recording laser power such that the carrier-to-noise ratio (CNR) of a signal falls within an optimum range. The determined recording laser power serves as the laser drive signal generated by the laser control circuit 36C and is supplied from the laser drive circuit 38.

Figure 3:
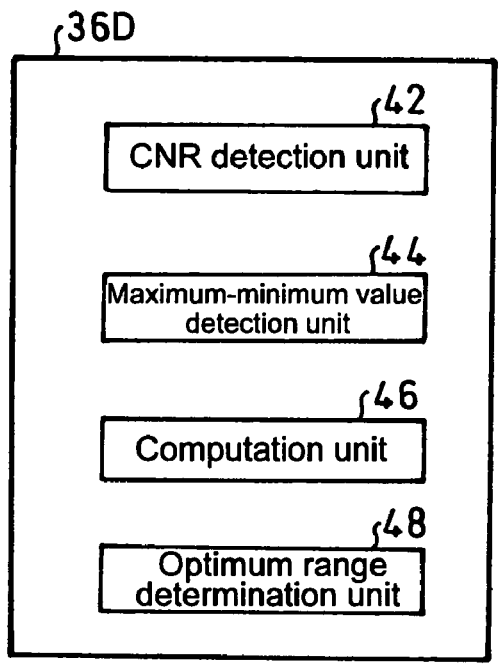
FIG. 3 is a block diagram schematically illustrating a recording laser power determination circuit in accordance with the exemplary embodiment of the present invention.

As shown in FIG. 3, the recording laser power determination circuit 36D is provided with a CNR detection unit 42, a maximum-minimum value detection unit 44, a computation unit 46, and an optimum range determination unit 48.

The CNR detection unit 42 detects the CNRs of data obtained by reading recording marks formed by test-writing before recording and supplies the CNRs to the maximum-minimum value detection unit 44.

The maximum-minimum value detection unit 44 determines a minimum value and a maximum value of the recording laser power falling within a recordable range, for forming recording marks corresponding to preferable CNRs out of the CNRs received from the CNR detection unit 42, and supply the computation unit 46 with the determined minimum and maximum values.

Here, the recordable range refers to a laser power range within which, the CNR of reproduction data is equal to or larger than a given value when recording is carried out.

The computation unit 46 computes a difference between the two values received from the maximum-minimum value detection unit 44 and supplies the optimum range determination unit 48 with the minimum value and a value obtained by adding one-third of that difference to the minimum value.

The optimum range determination unit 48 determines that an optimum range of recording laser power lies between the two values received from the computation unit 46.

EXAMPLES

Recording on the above super-resolution optical recording medium was performed using an information recording and reproducing apparatus which has an optical system with λ=405 nm and NA (Numerical Aperture)=0.85 and using a single frequency signal at different recording laser powers, and a CNR was measured. Specifically, the CNR of 8T marks recorded using single pulses was measured. 8T marks is larger than the diffraction limit of a reproduction optical system, because of 2T=75 nm and thus 8T=300 nm (>λ/NA/4).

The results are shown in Table 1.

TABLE 1

|   | Recording power (mW) | 8T CNR (dB) |
|---|---|---|
| A | 3.5 | 50.1 |
| B | 4.0 | 51.9 |
| C | 5.0 | 50.6 |
| D | 6.0 | 49.1 |
| E | 7.0 | 45.3 |
| F | 8.0 | 30.5 |

Figure 4:
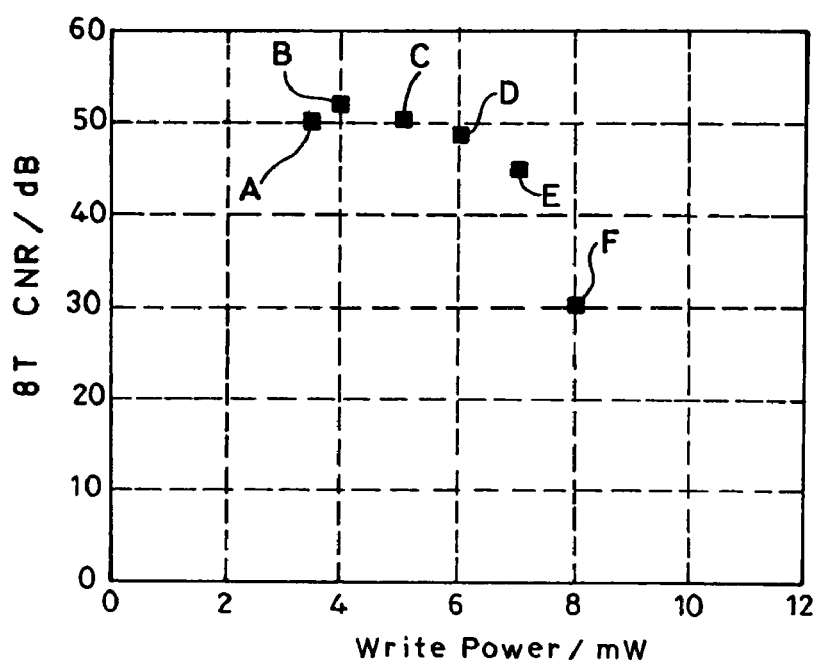
FIG. 4 is a graph plotting the CNR (Carrier to Noise Ratio) of 8T marks when the 8T marks are recorded using single pulses at different laser powers.

In addition, the results are plotted in FIG. 4. In FIG. 4, the vertical axis represents the CNR of the 8T marks, and the horizontal axis represents the recording laser power. Plotted points A to F correspond to A to F, respectively, in Table 1.

As can be seen from Table 1 and FIG. 4, the plotted points A, B, and C are within the recordable range, i.e., the recordable range is from 3.5 to 5.0 mW.

In the examples, the recordable range is a range in which the CNR of an 8T mark is 50.0 dB or more.

Figure 5:
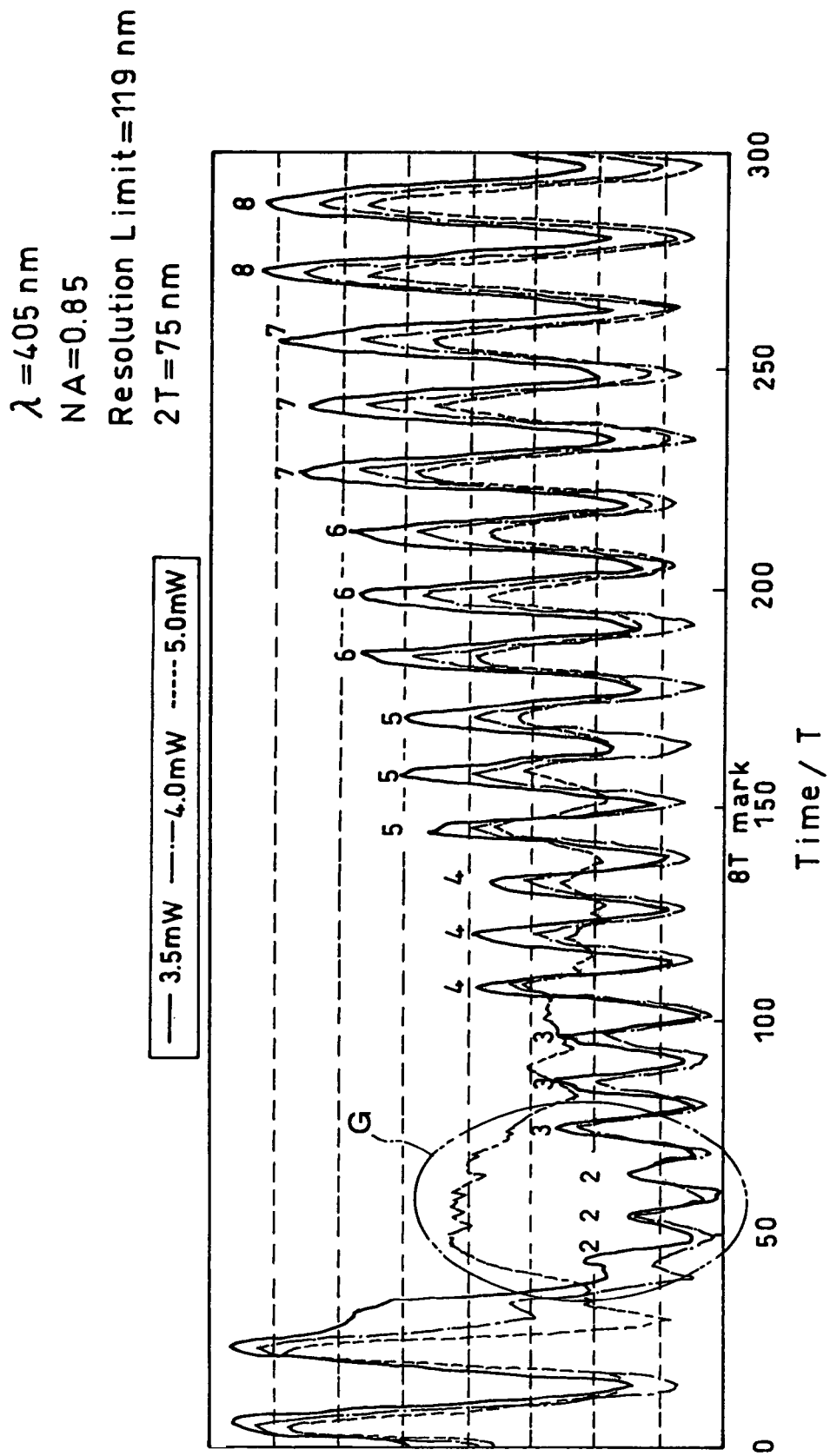
FIG. 5 is a graph showing the reproduction waveform of recording patterns recorded using combinations of an 8T mark and 2T to 8T spaces at recording laser powers within a recordable range.

A signal having a predetermined pattern was recorded using combinations of an 8T mark and 2T to 8T spaces (represented by symbols 2 to 8 in FIG. 5) at three laser powers of 3.5 mW, 4.0 mW, and 5.0 mW, which are all within the recordable range. FIG. 5 shows the reproduction waveform of the recording pattern for each of the laser powers. In FIG. 5, the solid line represents the waveform when a recording laser power level of 3.5 mW was used for recording. The one-dot chain line represents the waveform when a recording laser power of 4.0 mW was used for recording. The dashed line represents the waveform when a recording laser power of 5.0 mW was used for recording. As shown in an area G surrounded by the two-dot chain line in FIG. 5, the reproduction waveform with 2T space was satisfactory when recording was performed at laser powers of 3.5 mW and 4.0 mW. However, the waveform was distorted when recording was performed at a laser power of 5.0 mW. This may be because the marks are not separated due to intersymbol interference during recording.

According to the examples, it was found that the lower limit of the optimum range is the minimum value of the recordable range and the upper limit is a value obtained by adding to the minimum value one-third the difference between the maximum value and the minimum value of the recordable range.

As can be seen from the above, when an existing method for determining recording laser power is employed for recording on a super-resolution optical recording medium, uniformity of reproduction signal levels cannot be maintained during reproduction, and thus the separability of the waveform is poor. However, when the laser power determination method of the present invention is employed, the waveform during reproduction is satisfactory.

In the examples, the recordable range is a range in which the CNR of 8T marks is 50.0 dB or more, but the recordable range may be defined using marks other than the 8T marks and using a criterion other than when "the CNR is 50.0 dB or more."

What is claimed is:

1. A method for determining a laser power when information is recorded on a super-resolution optical recording medium by irradiating a laser beam modulated into a recording pulse train according to recording data to thereby form a recording mark train including recording marks and spaces smaller than a resolution limit of a reproduction optical system and recording marks and spaces equal to or larger than the resolution limit, the method comprising the steps of:

determining a maximum value and a minimum value of recordable laser powers determined by test-writing before recording;

determining a maximum value of a recordable range of recording laser power by adding to the minimum value one-third of a difference between the maximum value of the recordable laser powers and the minimum value; and setting an optimal range of the recording laser power from the minimum value of the recordable laser powers to the maximum value of the recordable range.

2. An apparatus for recording information on a super-resolution optical recording medium by irradiating a laser beam modulated into a recording pulse train according to recording data to thereby form a recording mark train including recording marks and spaces smaller than a resolution limit of a reproduction optical system and recording marks and spaces equal to or larger than the resolution limit, the apparatus comprising:

a head for irradiating the laser beam onto the super-resolution optical recording medium;

a laser drive circuit for supplying the head with a laser drive signal for modulating the laser beam into the recording pulse train;

a laser control circuit for generating the laser drive signal; and a recording laser power determination circuit which determines a minimum value and a maximum value of recordable laser powers determined by test-writing before recording, determines a maximum value of a recordable range of laser power by adding to the minimum value one-third of a difference between the maximum value of the recordable laser powers and the minimum value, sets an optimal range of the recording laser power from the minimum value of the recordable laser powers to the maximum value of the recordable range, and outputs the optimal range to the laser drive circuit.

\* \* \* \* \*